(12) United States Patent
Lewis et al.

(10) Patent No.: US 9,280,281 B2
(45) Date of Patent: Mar. 8, 2016

(54) SYSTEM AND METHOD FOR PROVIDING GESTURE-BASED USER IDENTIFICATION

(75) Inventors: Timothy A. Lewis, El Dorado Hills, CA (US); Jeremy Wang, New Taipei (TW); Kevin Davis, Beaverton, OR (US); Lawrence Chiu, New Taipei (TW)

(73) Assignee: Insyde Software Corp., Taipei (TW)

( * ) Notice: Subject to any disclaimer, the term of this patent is extended or adjusted under 35 U.S.C. 154(b) by 32 days.

(21) Appl. No.: 13/611,992

(22) Filed: Sep. 12, 2012

(65) Prior Publication Data

US 2014/0075549 A1    Mar. 13, 2014

(51) Int. Cl.
*G06F 21/00* (2013.01)
*G06F 3/041* (2006.01)
*G06F 3/048* (2013.01)
*G06F 21/31* (2013.01)
*G06F 3/0488* (2013.01)

(52) U.S. Cl.
CPC ............ *G06F 3/04883* (2013.01); *G06F 21/31* (2013.01)

(58) Field of Classification Search
None
See application file for complete search history.

(56) References Cited

U.S. PATENT DOCUMENTS

| | | |
|---|---|---|
| 2002/0109677 A1 | 8/2002 | Taylor |
| 2009/0289916 A1 | 11/2009 | Dai |
| 2010/0031200 A1 | 2/2010 | Chen |
| 2011/0300831 A1 | 12/2011 | Chin |
| 2012/0066650 A1* | 3/2012 | Tirpak et al. ................ 715/863 |
| 2012/0194440 A1* | 8/2012 | Ramrattan et al. ........... 345/173 |
| 2013/0234971 A1* | 9/2013 | Li .................................. 345/173 |

FOREIGN PATENT DOCUMENTS

| | | |
|---|---|---|
| KR | 10-2012-0020662 A | 3/2012 |
| WO | 2014043307 A1 | 3/2014 |

OTHER PUBLICATIONS

International Search Report, PCT/US2013/059378, dated Dec. 26, 2013.

* cited by examiner

*Primary Examiner* — Michael Chao
*Assistant Examiner* — Shu Chun Gao
(74) *Attorney, Agent, or Firm* — McCarter & English, LLP; John S. Curran

(57) ABSTRACT

A mechanism for allowing a user to prove their identity on touch-based devices employing the use of a touch surface in firmware-controlled environments is discussed. The user may prove his or her identity by entering a series of strokes on the touch-based device to form a word or image. Characteristics of the entered strokes such as stroke order and stroke direction are compared to stored stroke characteristics that were gathered from a drawing of the same word or image during a user enrollment process. If the stroke characteristics comparison is acceptable, the user identity is verified.

24 Claims, 9 Drawing Sheets

302   304   306   308   310   312   314   316   318

504
506
508

QUADRANT ORDER: 7-4-1-2-4-5-8-5-6-2-3-6-9 520

525  Example Translations:
7-4 = Up                    8-5 = Up Right
7-4-1 = Up                  8-5-3 = Up Right
1-4-5-8 = Down Right        8-5-6-3 = Up Right
1-2-4-5-8 = Down Right      8-6-5-3 = Up Right
1-2-5-4-8 = Down Right      8-5-6-2-3 = Up Right
1-5-4-8 = Down Right        3-6 = Down
1-5 = Down Right            3-6-9 = Down
1-5-9 = Down Right
1-5-8 = Down Right
1-2-5-8 = Down Right

530

SYSTEM AND METHOD FOR PROVIDING GESTURE-BASED USER IDENTIFICATION

BACKGROUND

Traditionally, user identity has been proved by something a user has, something a user knows, or something a user is, i.e. a physical characteristic of the user. For example, a user might prove his or her identity with a hardware or software token or badge in their possession. A user also might prove their identity by something they know such as a secret like their mother's maiden name or a password. Alternatively, a user could prove their identity by a physical characteristic of the user like a fingerprint, retina scan or DNA sample. These different mechanisms for proving user identity are available to control access to today's computing devices. However, many of these technologies present challenges for mobile users because of platform constraints such as a lack of a physical keyboard or necessary interfaces for input devices. These constraints make the input of the required information needed to prove identity by a mobile device user difficult or impossible depending upon the desired mechanism. For example, without the right interface a mobile device will not support a fingerprint sensor or smart card and users accustomed to physical keyboards may find it hard to enter passwords through an on-screen keyboard displayed on a touch screen. Furthermore, existing methods of proving user identity that are specifically designed for touch-based devices, like handwriting recognition processes, often require too much storage and/or computing power to work effectively in a limited resource environments, such as where the user identification process is executed by a computing device's firmware.

BRIEF SUMMARY

Embodiments of the present invention provide a mechanism for user-identification on touch-based devices. More specifically, the embodiments of the present invention enable the receipt and analysis of gesture-based "passwords" input by a user as a series of gestures or strokes on a touch surface while drawing or tracing a word or image. Rather than recording the entered word or image in its entirety as the gesture password, characteristics related to the component gestures making up the entered word or image such as stroke direction, stroke order and stroke connection may be recorded as the gesture password. The recorded gesture password record is of a small size and may be processed with limited code during a verification process making the gesture passwords of the present invention particularly applicable to being executed as part of an identification process being executed by firmware in a computing device.

In one embodiment, a computing device provides gesture-based user identification. The computing device includes a touch surface accepting input gestures from a user and a processor configured to execute instructions for user identification. The instructions prompt a user to enter a word or image through the touch surface. The word or image is entered as individual strokes whose characteristics collectively form a stroke password. The stroke password is stored as information regarding stroke direction and stroke order for each of the individual strokes forming the stroke password. The stored stroke password is associated with the user. The instructions further receive through the touch surface, subsequent to the storing of the stroke password, a word or image entered as individual strokes whose characteristics collectively form a stroke verification password. The stroke verification password includes information regarding stroke direction and stroke order for each of the individual strokes in the strokes forming the stroke verification password. The stroke verification password is compared to the stored stroke password. The instructions also identify the user that entered the stroke verification password on the basis of a comparison between the saved stroke password and the stroke verification password.

In another embodiment, a computer-implemented method for providing gesture-based user identification prompts a user to enter a word or image through a touch surface capable of accepting input gestures from the user. The word or image is entered as individual strokes whose characteristics collectively form a stroke password. The method also stores the stroke password entered by the user. The stroke password is stored as information regarding stroke direction and stroke order for each of the individual strokes forming the stroke password. The stored stroke password is associated with the user. The method also receives through the touch surface, subsequent to the storing of the stroke password, individual strokes whose characteristics collectively form a stroke verification password. The stroke verification password includes information regarding stroke direction and stroke order for each of the individual strokes forming the stroke verification password. The method further compares the stroke verification password to the stored stroke password and identifies the user that entered the stroke verification password on the basis of a comparison between the saved stroke password and the stroke verification password.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
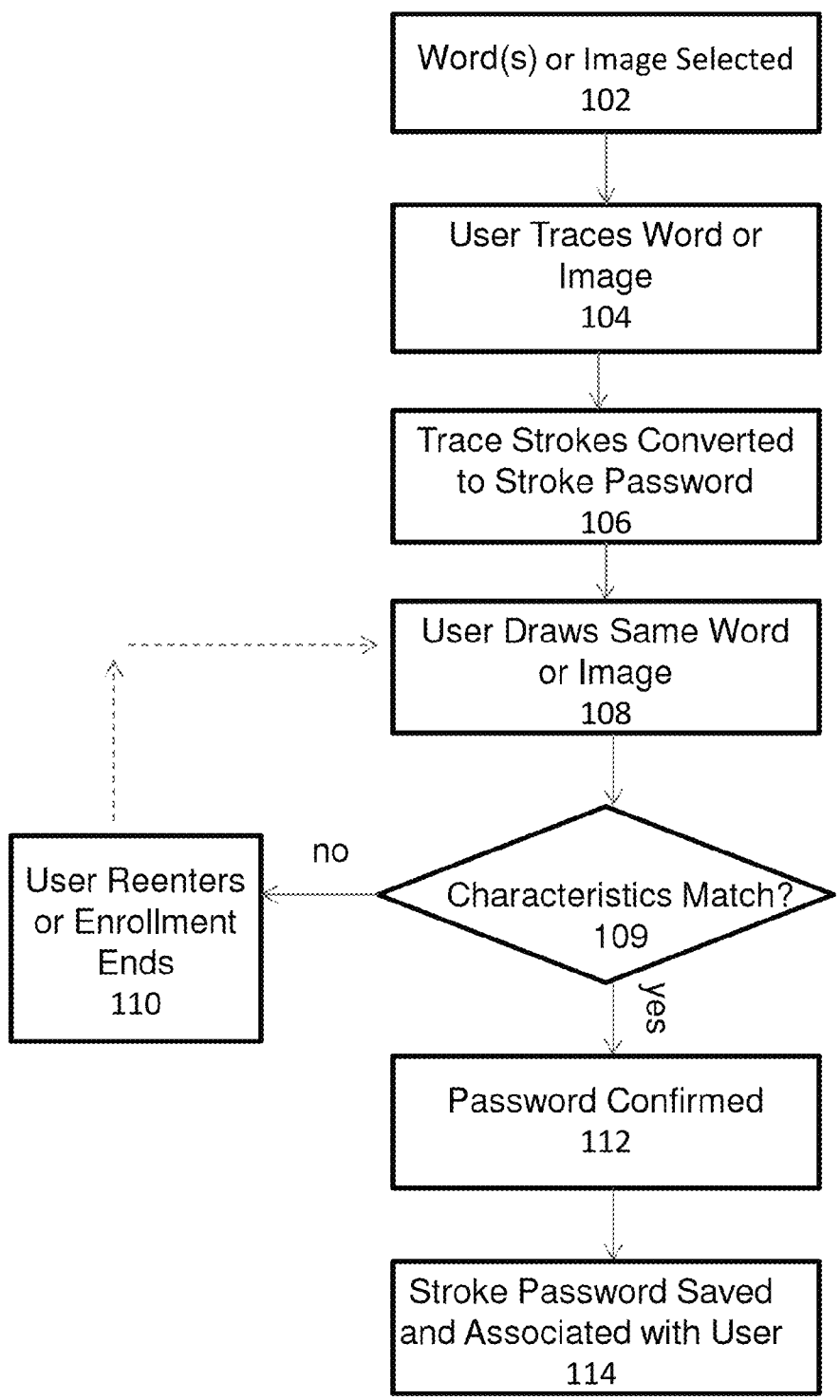
FIG. 1 depicts an exemplary sequence of steps executed by an embodiment of the present invention performing an enrollment process for a user.

The embodiments of the present invention provide a mechanism for allowing a user to prove their identity on touch-based devices employing the use of a touch screen or touch surface in firmware-controlled environments. The user may prove his or her identity by entering a series of strokes on the touch-based device to form a word or image. Characteristics of the entered strokes such as stroke order and stroke direction are compared to stored stroke characteristics that were gathered from a drawing of the same word or image during a user enrollment process. If the stroke characteristics match or satisfy other criteria, the user identity is verified.

Computing devices are initialized by firmware included within the device and this firmware provides a range of software services which facilitate the boot of the operating system as well as providing a smaller subset of these services that continue to be available after the operating system has booted. Firmware is software that has been written onto Read-Only Memory (ROM) modules including but not limited to ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security reasons. Due to the cost of the ROM modules, the amount of ROM available to store firmware is limited in computing devices. Accordingly, an advantage of the user identification process described herein is that the embodiments of the present invention provide a user identification process that may be practiced by firmware executing on a touch-based device even in the resource-constrained environment in which firmware typically operates.

Conventional techniques that have been developed to prove identity on touch-based computing devices are not particularly suitable for execution by firmware, either because of a lack of effectiveness or through a requirement for more resources than are present when firmware is being executed. For example, a smart phone 9 or 12 box grid (which translates a pattern into a box number) suffers from security difficulties since there are relatively few patterns used in practice, users start in only a few places, and the patterns use, at most, four adjacent boxes. Handwriting recognition provides better security than the 9 or 12 box grid and works well with a touch-based interface. However, handwriting recognition is more difficult to implement with firmware because it is computationally intensive in that it requires significant amounts of code to perform processing of the input handwriting and requires a large database, both of which are cost-constrained factors in the environments in which firmware operates. In contrast to these conventional techniques, the embodiments of the present invention store a gesture-based password record that is of a small size and that may be processed with limited code.

The user authorization process of the present invention begins with an enrollment process during which a user provides and then confirms a gesture-based password. Enrollment is thus a process by which a user shares a secret (in this case, the stroke/gesture-based password) with the system that the system will use later to verify user identity. The enrollment process may be initiated by a current user who already possesses the requisite administrative privileges for saving passwords or the enrollment process may need to be authorized by an administrator if the target user who is being enrolled does not have sufficient privileges to initiate the process. The password may be stored to control subsequent access to any of a number of aspects of the computing device. For example, the password may be used to control the user's access to BIOS setup menus for the computing device.

FIG. 1 depicts an exemplary sequence of steps executed by an embodiment of the present invention performing an enrollment process for a user. The enrollment sequence begins with a word or words or image being selected by a user (step 102). The word or image that is selected may be suggested by the enrollment process. For example, the enrollment process of the present invention may supply a pull down list or other collection of words or images to the user and prompt the user for a selection. The list may be words or images from a pre-defined list, or the enrollment process may generate a random combination ("red black" or "big job" or "real abs"). This approach of the enrollment process suggesting the words has a disadvantage in that the words are typically less memorable (since they are not chosen by the user) but the advantage in that they do not require any typing. Alternatively, in a different aspect of the invention, the user may provide their own word(s) or image for the enrollment process by entering it through a on-screen keyboard or other keyboard/input device. In the case of auto-generated word/image lists, the total stroke count of such words should preferably be low. For ideograph character sets, such as those used in Chinese, Korean and Japanese, in one embodiment, only a character or two is necessary.

Once the word(s) or image(s) have been selected, they are displayed by the enrollment process and the user is prompted to trace them on the touch-based surface of the computing device (step 104). It should be appreciated that the touch-based surface of the computing device will frequently also be the display screen of the computing device, but in alternative embodiments the touch surface may be a surface that accepts touch-based input that is different from the display screen/surface. Accordingly, where the terms "touch screen" or "touch surface" are used in this description, they should be understood to also include touch-based surfaces that differ from the main display screen/surface of the computing device. During enrollment, the word(s) or image(s) may be enlarged to make the tracing process easier. The tracing may be performed by finger strokes made on the touch surface and the movement while the finger is touching the screen is sampled periodically and recorded. For example, in one embodiment the coordinates from the movements may be sampled and the coordinates relative to the top-left edge of the screen recorded. It should be appreciated that the above-described process may also be performed without enlarging the word or image. In an alternative embodiment, the selected word or image may be traced from the user's memory without a display of the word or image on the touch-based screen.

The enrollment process uses a word or image as a visual hint for the user. The usage of the word or image establishes in short-hand fashion—the series of strokes that the user will enter as a gesture/stroke password, both during the enrollment process and later during verification/identification. For example, if DOG is the word, the user remembers DOG (a relatively simple mental image), but draws down-up-right-down-left, right-down-left-up, left-down-right-up(short) or something similar, rather than typing D-O-G. As will be described in more detail further below, the enrollment process does not track shapes of individual characters but rather captures the direction and other characteristics of finger travel. It may also account for "wide-finger" issues, through the use of quadrants and path simplification as also explained further below.

It will be appreciated that the tracing of the word or image during enrollment may be performed in a number of different ways known in the art such as tracing that is performed on the touch surface with finger strokes, stylus strokes or other touch-based gestures (in alternative embodiments using non touch-based screens other methods such as mouse tracings may be employed). The characteristics of the user's individual strokes tracing the selected word or image are captured by the enrollment process and converted into a stroke password in a manner described further below (step 106). The drawing area of the touch surface is then cleared and the user may be prompted to repeat the process and confirm the stroke password strokes without the pre-drawn image being displayed (step 108). Optionally, in an alternative embodiment, the application may also provide stroke guides such as on-screen arrows and user feedback, such as stroke indicators, rather than making the user confirm the original traced drawing completely from memory. The stroke characteristics from the user's tracing and subsequent confirmation drawing of the word or image are compared (step 109). If there is no match between the two attempts (step 110), the user may be prompted to try again or the enrollment process may terminate depending on its implementation. On the other hand, if the stroke characteristics match, the stroke password is confirmed (step 112), associated with the user, and saved into non-volatile memory for later retrieval (step 114).

Of note, the enrollment process of the present invention stores characteristics of the strokes that collectively form the word or image in non-volatile memory as a stroke password instead of storing the entirety of the image being drawn. The relationship between the strokes and the word used is not recorded. The characteristics that are stored may include stroke order, stroke direction. The characteristics may also include stroke connection (that is, whether the finger was lifted between strokes). Additional stroke characteristics such as stroke timing (how long it takes a user to make a stroke) and stroke intensity (the pressure or thickness of a stroke) may also be saved. With the present invention, the user identity is later proven by the stroke characteristics of the strokes the user makes while drawing the secret word or image rather than by a comparison of the input to an entire stored image.

Following enrollment, the saved stroke password from the enrollment process is subsequently used to identify the user. This identification can involve having a user select who they would log-in as, and then having the user logging in enter a verification password whose characteristics are compared to characteristics of the saved stroke password associated with the claimed identity. Alternatively the identification process can involve having the user enter a verification password whose characteristics are compared to the characteristics of all of the saved passwords.

Figure 2:
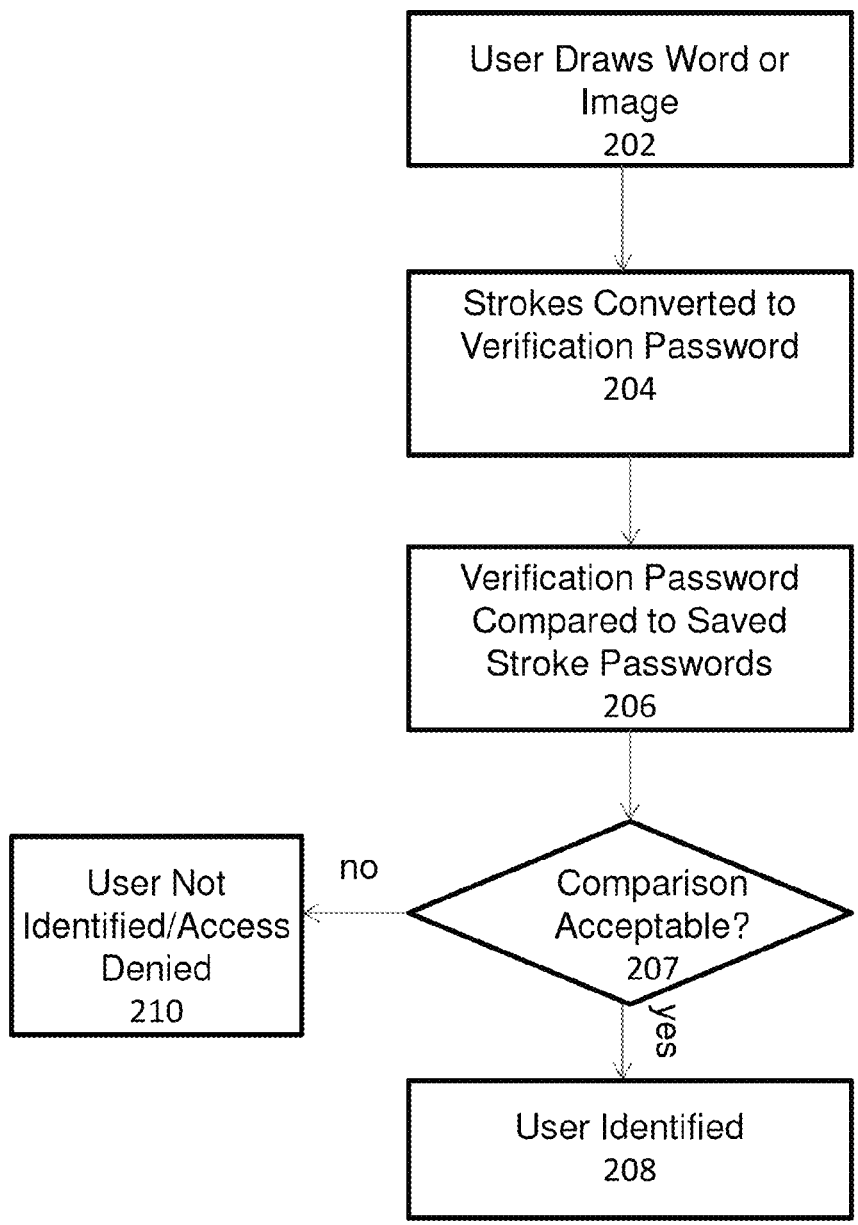
FIG. 2 depicts an exemplary sequence of steps executed by an embodiment of the present invention to identify a user.

FIG. 2 depicts an exemplary sequence of steps executed by embodiment of the present invention to identify a user. The identification process may begin with a user drawing a word or image (step 202). The characteristics of the individual strokes made by the user to draw the word or image are captured and collectively form a verification password (step 204). The verification password is then compared to all of the saved stroke passwords to attempt to identify either an exact match or satisfaction of defined criteria that is somewhat more flexible and does not require an exact match (step 206). If the comparison is satisfactory (step 207), the user is identified as the user associated with the saved stroke password (step 208). Alternatively, if the comparison is not satisfactory (step 207), the user is not identified and access to all or part of the computing device that is controlled by password may be denied (step 210). In an alternative embodiment, rather than comparing the verification password to all of the stored passwords, the user may provide their claimed identity and the identification process may only compare the verification password to the stored stroke password associated with the individual that the user is claiming to be.

Figure 3:
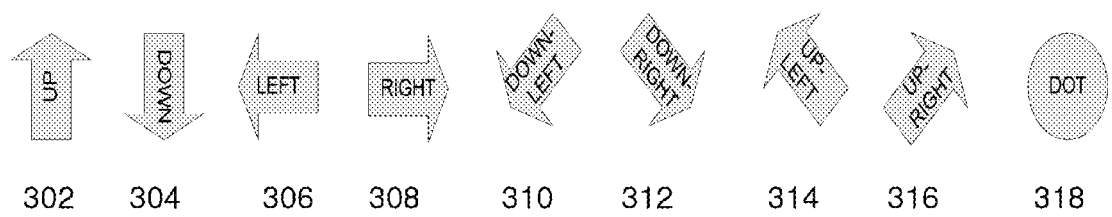
FIG. 3 represents exemplary stroke directions recorded for individual strokes made by a user during the enrollment or identification process.

As noted above, the stroke characteristics that are captured to collectively form the stroke and verification passwords may include stroke direction, stroke order and in some cases stroke connection or other stroke characteristics. For example, FIG. 3 represents exemplary stroke directions that may be stored for each stroke a user makes while drawing the word or image during the enrollment process. Stroke direction may be recorded as Up (302), Down (304), Left (306) and Right (308). Similarly, the stroke direction of the individual strokes may be recorded as Down Left (310), Down Right (312), Up Left (314) and Up Right (316). It will be appreciated that other directions may be also be stored in addition to or instead of the directions depicted in FIG. 3 without departing from the scope of the present invention. The stroke may also be recorded as a dot (318) when the entire gesture fails to traverse a minimum amount of distance on the touch surface. The order of the stroke entry and the connections between strokes may also captured. The gesture recording performed by the embodiments of the present invention is not sensitive to relative character or screen positioning. That is, it does not matter whether the drawn characters overlap or are positioned correctly or where they are on the screen. In addition, the captured gestures can be drawn at an angle. The captured stroke information may be stored in fairly compact form, for example, in a form requiring 5 bits per stroke and 2-4 strokes per character. While this results in roughly twice as much storage per character as a textual password character, it is much smaller than a full gesture capture and the gesture processing code is small, comparable to the amount of code needed to perform hashing of a password.

The enrollment and identification processes described above with respect to FIGS. 1 and 2 process the user-entered 'strokes' by capturing information gathered from the user's enrollment tracing, and subsequent confirmation drawing, of a word(s) or image that is converted into a series of strokes, or well-defined movements. These strokes can then be compared against a recorded set of strokes. A stroke may be a finger event or a gesture event. A finger event occurs when the user touches the touch surface (finger down) or stops touching the touch surface (finger up). For the purposes of this description, the term "touch surface and touch screen" both refer to the surface across which finger movement can be detected. While this description uses terms like "gesture", "finger down" and "finger up", it should be appreciated that similar behavior can be achieved using mouse movement, mouse-button down and mouse-button up or other types of pointer devices. In embodiments of the present invention, a stroke or gesture event occurs when, after a finger down event but before a finger up event, the user moves a finger across the touch surface. As discussed above, the strokes may be categorized into nine basic types: dot, move left, move right, move up, move down, move up-right, move up-left, move down-right and move down-left. It should be appreciated however that additional gestures can also be added to, or used to replace, some or all of these gesture types. For example, a gesture length of short or long, or different stroke angles can be extrapolated to differentiate similar gestures.

In embodiments of the present invention, when the user makes a gesture, as the user's finger is moved on the touch screen/surface, its position can be detected relative to a position (such as the top left) of the touch surface. Recorded samples of the X and Y screen/surface coordinates of the finger while the finger is down are captured and collectively called a trace. The algorithm described below in reference to FIG. 4 converts the trace into a series of one or more strokes. The collection of characteristics of all of the strokes from all of traces captured while the user traces/draws the word(s) or image creates a stroke or verification password, the capture process being the same for both types of gesture passwords.

Figure 4:
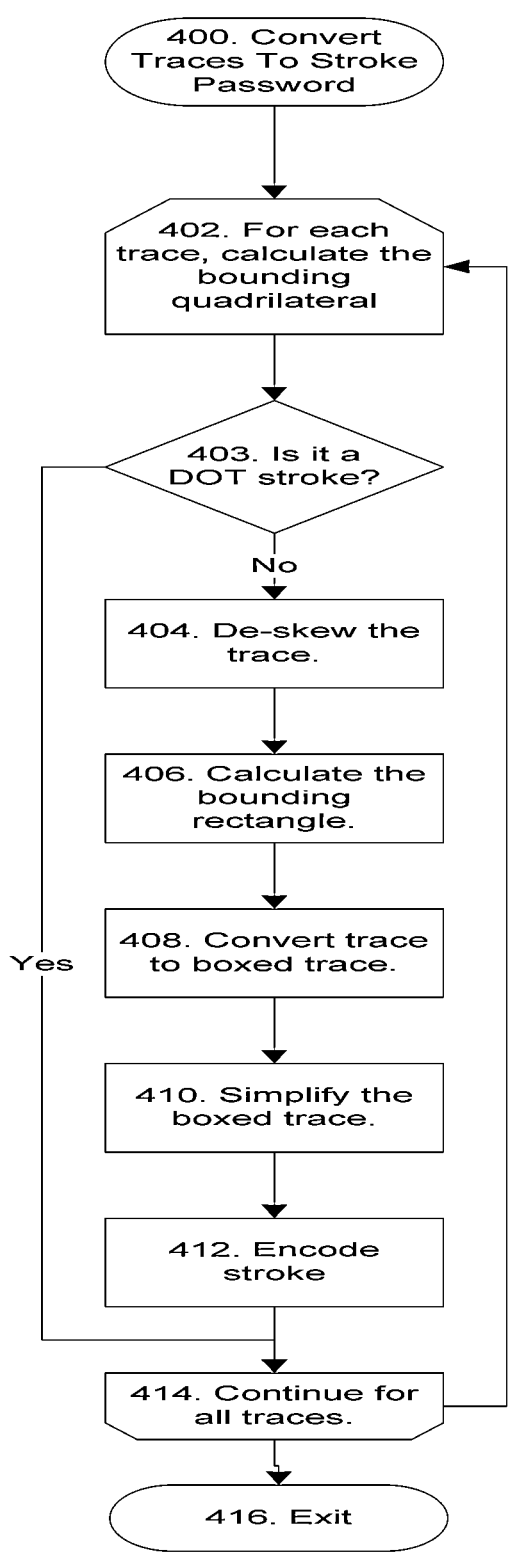
FIG. 4 depicts an exemplary sequence of steps executed by embodiment of the present invention to convert a trace into stroke characteristics.

FIG. 4 depicts an exemplary sequence of steps followed by an embodiment of the present invention to convert a trace into strokes whose characteristics collectively form a stroke or verification password. The trace process (400) begins by calculating a "bounding quadrilateral" for each trace (402). The bounding quadrilateral is created in three steps. As a first step, the smallest rectangle which contains all trace coordinates is calculated. By definition each side of this rectangle will intersect least one trace coordinate. Second, for each corner of the rectangle, the closest trace coordinate along either of the two rectangle sides attached to that corner is found. Third, the bounding quadrilateral is constructed from the four coordinates found in the previous step. The bounding rectangle is the smallest rectangle which can encompass an entire de-skewed trace (de-skewing is discussed further below). The trace is then checked to verify that it is not a "dot" stroke by checking the "X size" and "Y size" of the trace (403). The X size is the difference between the maximum X coordinate in the trace and minimum X coordinate in the trace. The Y size is the difference between the maximum Y coordinate in the trace and the minimum Y coordinate in the trace. If the X size and Y size both do not exceed a pre-defined "dot threshold", then the stroke consists of a DOT stroke. This dot analysis handles the case when the user puts their finger down and then lifts their finger without moving their finger a significant distance, such as with a period or the dot above a lower-case "i". Although the user intended a dot, the trace might contain several sets of coordinates. For example, with a mouse device, tiny movements might create minor coordinate variations. Or, with a touch screen, the finger might actually come in contact with the touch screen at several points. The dot threshold helps distinguish between this case and the case when the user has made a gesture. Also, since the user has lifted their finger, a "stroke done" stroke is recorded to demarcate the DOT stroke from any succeeding strokes. If it is a dot stroke, the processing of the trace is skipped and the processing is continued for all remaining traces (414).

If the trace is not a dot, it is de-skewed (404). For example, the user may have drawn a stroke at an angle. There are various well-known transformations that may be employed on coordinate sets to de-skew them. One such approach compares the angle created by the bottom and left edges of the bounding quadrilateral with the angle created by the bottom and right edges of the bounding quadrilateral. If they are roughly the same, then the trace may be skewed and the coordinates of the trace may be adjusted so that the left and right edges of the bounding quadrilateral are at 90 degrees (vertical).

After the trace has been de-skewed, the bounding rectangle is calculated (406). As noted above, the "bounding rectangle" is the smallest rectangle which can encompass the entire de-skewed trace. A "normalized bounding rectangle" consists of the bounding rectangle where the left-most X coordinate is 0 and the top-most Y coordinate is 0.

After the calculation of the bounding rectangle, the trace is converted to a "boxed trace". The box trace is formed by converting the trace to a box grid (408) by dividing the total area of the bounding rectangle into a 3×3 grid, with each grid square covering approximately ⅓ of the total width and height. The trace is then processed by recording which of the grid squares the trace coordinates fall into. The resulting record is called the "boxed trace". For convenience, the boxes may be numbered sequentially from top to bottom, left to right, starting with 1. So a 3×3 grid may have boxes 1 to 9. It will be appreciated that the size of the grid can be altered to give greater definition, as needed, without departing from the scope of the present invention. It will be appreciated that in alternative embodiments, the box trace may be formed using a "n×n", or "n×m" or "m×n" grid where "n" is not equal to 3.

Once the trace has been boxed, it is then simplified (410). Because of mouse jitter or "fat fingers", the boxed trace may swerve into neighboring boxes before reaching the intended destination. These swerves are well understood and predictable. By searching for certain patterns in the boxed trace and replacing them with simplified patterns, the process of creating a stroke from the trace is easier.

Figure 5:
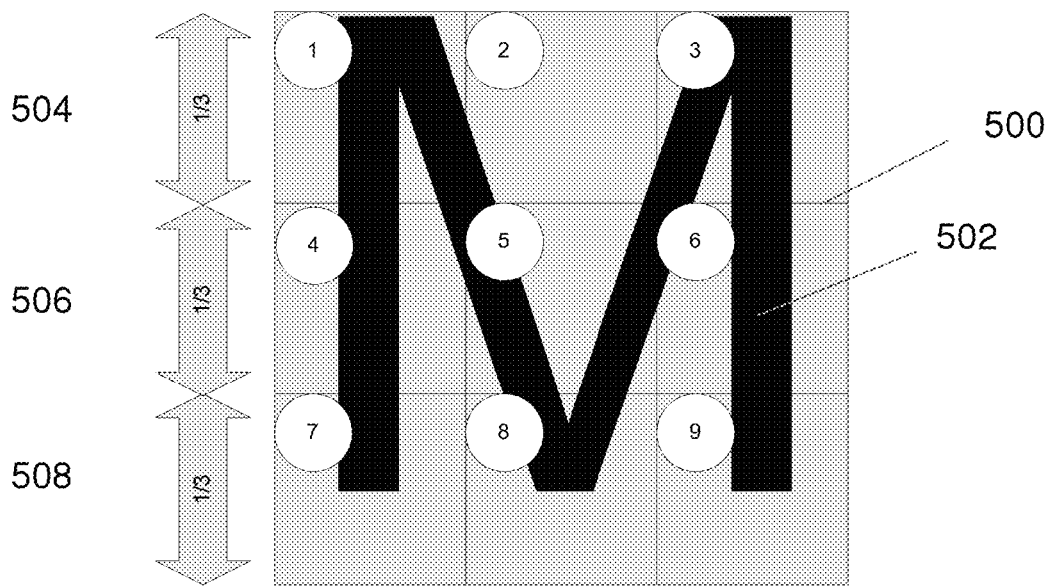
FIG. 5 depicts an exemplary boxed trace and sample translations that may be utilized by embodiments of the present invention.
Figure 5:
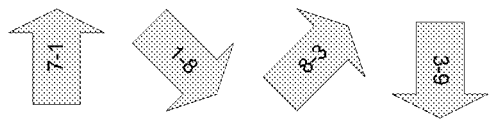

For example, FIG. 5 depicts an exemplary boxed trace and sample translations that may be utilized by the embodiments of the present invention. In FIG. 5 a grid (500) is superimposed over a user-drawn capital "M" trace (502). The grid is a 3×3 grid with 3 rows (504),(506) and (508) and individual unit cells ("quadrants") labeled 1-9. In one example, the letter "M" may be drawn as a single trace which traverses the quadrants of the grid 500 in the quadrant order (520) "7-4-1-2-4-5-8-5-6-2-3-6-9". The trace conversion process of the present invention interprets the stroke/gesture in the order "7-4" and "7-4-1" as up strokes. The change of direction in the trace from "up" to "down right" starts a new stroke. The stroke/gestures "1-4-5-8", "1-2-4-5-8", "1-2-5-4-8" and "1-5-4-8" (depending upon how straight the user made the gesture and which quadrants the gesture intersected) may all be interpreted by the trace conversion process of the present invention as a "down right" stroke. Similarly a change in direction to "up right" would also start a new stroke and the quadrant order of "8-5-3", "8-5-6-3", "8-6-5-3" may all be interpreted as "up right" strokes by the trace conversion process of the present invention. Likewise, the change in direction to "down" and the quadrant orders of "3-6" and "3-6-9" would both be interpreted as down strokes.

In FIG. 5, the example translations section (525) depicts exemplary stroke direction interpretations that may be employed by the trace conversion process of the present invention. As depicted, the four identified strokes in the trace (502) may be simplified to beginning and ending quadrants and the associated order and direction information (530) saved during enrollment as part of a stroke password. For the exemplary trace (502) this information may therefore include "7-1", up, followed by "1-8", down right, followed by "8-3", up right, followed by "3-9", down. The process is the same during the identification process except the captured information is compared to the saved information to verify user identity. It will be appreciated that the specific interpretation of trace information to account for inexact user drawings will vary between implementation as far as how much direction deviation is considered as part of one stroke or one direction.

Figure 6:
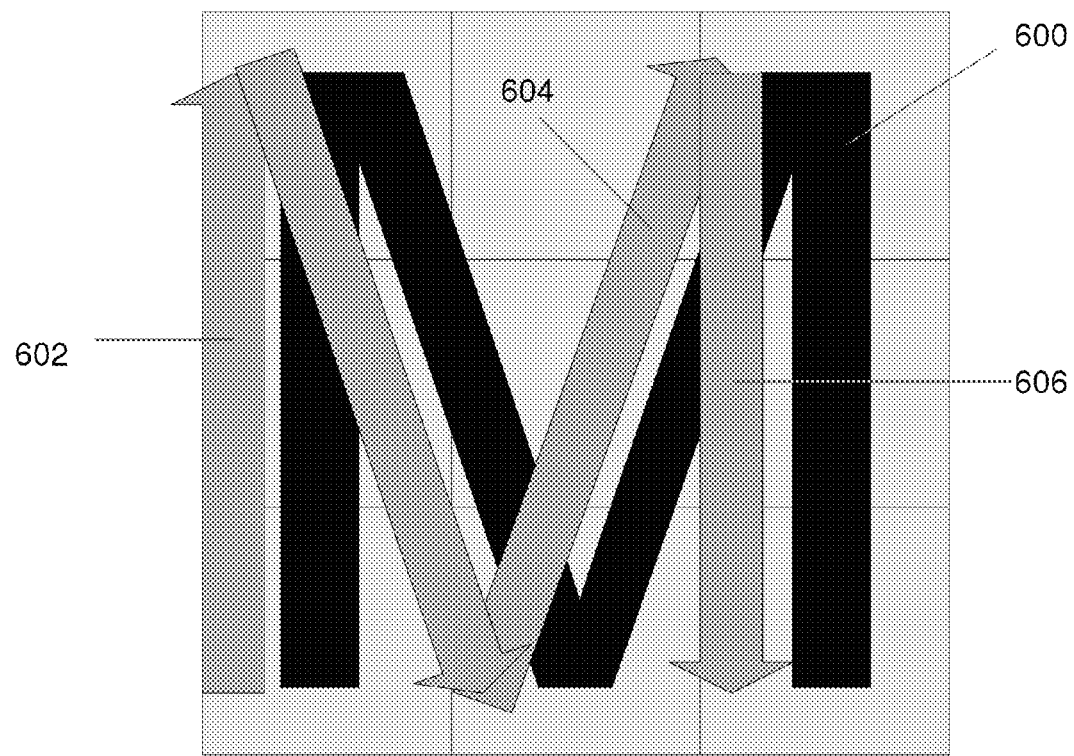
FIG. 6 depicts an exemplary augmented hint that may be utilized by the embodiments of the present invention.

Some users may be more proficient than others in making the gestures described herein. Accordingly, in an embodiment of the present invention, augmented hints may be used to assist the user while tracing and drawing the word or image during the enrollment process. For example as depicted in FIG. 6, one option to assist the user is to augment the "hint" aspect of the displayed word or image "hint" (600) (the displayed letter "M") so that the strokes being drawn by the user are detected and drawn as the traces the hint word or image. For example, depending on the character value, a pre-drawn grid is superimposed over the enlarged character glyph. The grid size is calculated based on the size of the character glyph plus an additional border area on all sides. Narrow characters may only occupy, for example, a single column while wide characters may occupy a full 3×3 grid, and so on. Other grid fitting methods are also possible within the scope of the present invention. With the augmented hint, as the user traces the letter, stylized arrows are superimposed over the tracing to show the strokes detected (602), (604) and (606), using the same process as described above except in real-time using the pre-calculated grid rather than a grid calculated based on the trace's bounding rectangle. In another alternative, the empty grid can be present when the user enters the verifies the stroke password, and even when the stroke password is entered during identification. This procedure increases the user's awareness of the strokes that make up the stroke password and increase the reproducibility of those strokes when being drawn.

Figure 7A:
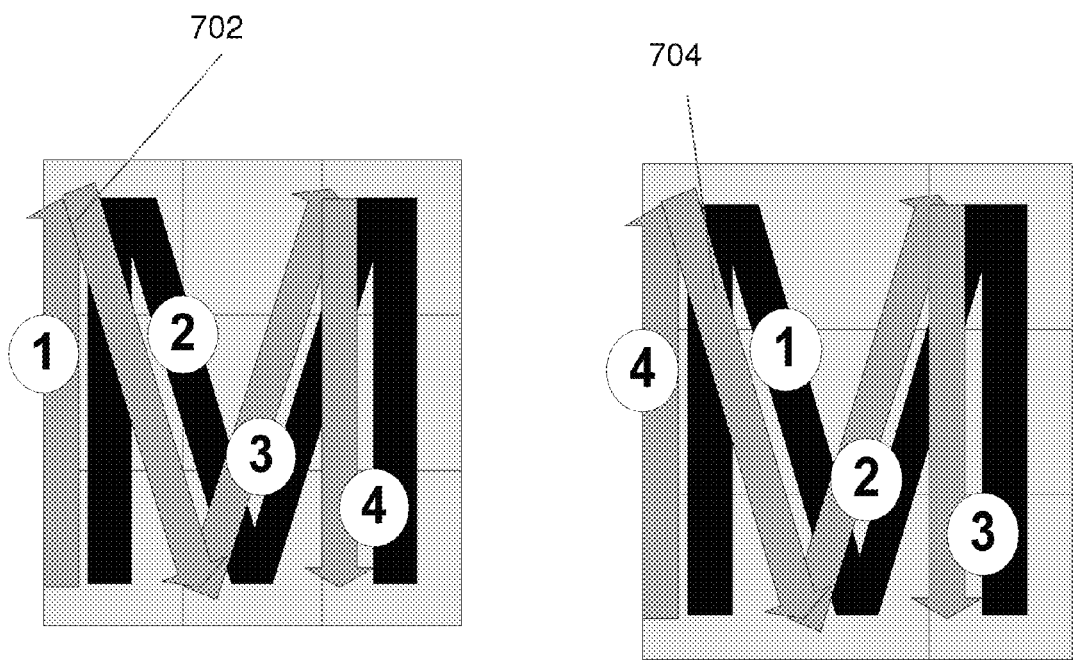
FIG. 7A depicts an exemplary stroke password comparison that may be utilized by the embodiments of the present invention.
Figure 7B:
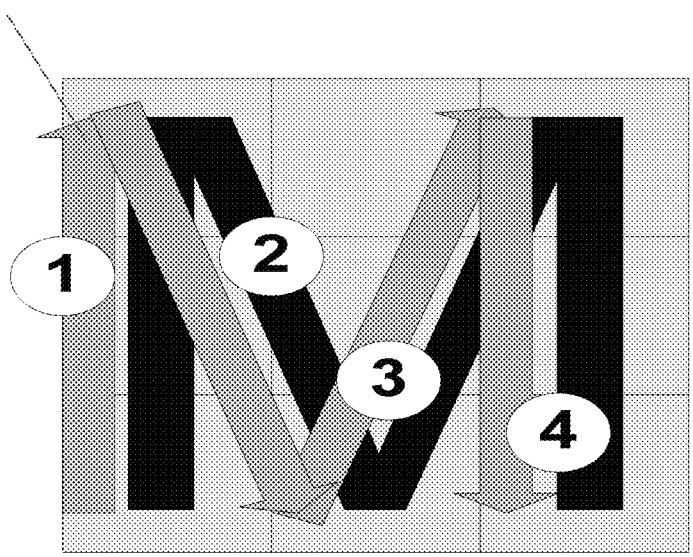
FIG. 7B depicts an additional exemplary stroke password comparison that may be utilized by the embodiments of the present invention.
Figure 7B:
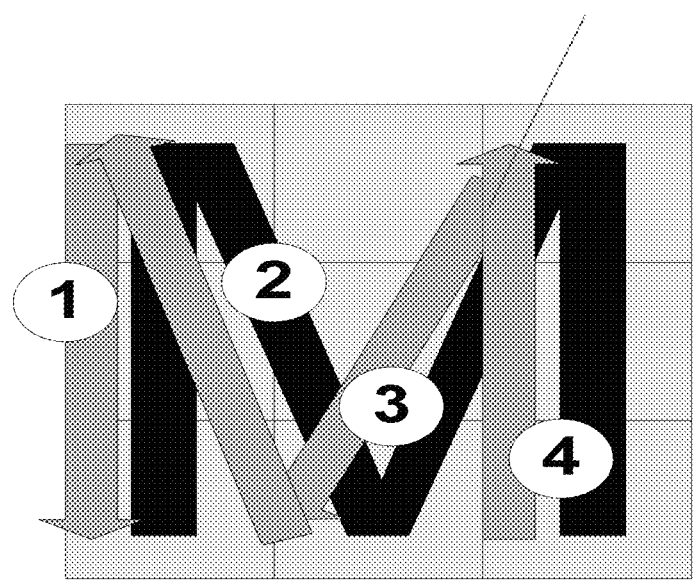

Although the above description has focused on a strict comparison between the stroke characteristics of the verification password and the characteristics of the saved stroke password, it should be realized that the embodiments of the present invention may also be implemented so as to allow more flexibility in determining whether a match has occurred. For example, in one embodiment, stroke order or direction may be interpreted in a non-rigid manner using more flexible criteria. Thus, users who draw strokes in different order or reversed direction may still be considered a match. While this reduces the security of the password (by allowing more possible matches), it reduces user confusion due to the fact that some characters can be drawn in multiple ways, even by the same user. FIG. 7A depicts an exemplary stroke password comparison in which the strokes within a single character can be entered in any order as long as the other characteristics match. Thus the original order of strokes 1-2-3-4 drawn for the letter "M" (702) during enrollment would be considered a match for the verification order of strokes 4-1-2-3 (704) as the other stroke characteristics are the same. It will be appreciated that the same result may be achieved if the 4-1-2-3 (704) order was drawn during enrollment and the 1-2-3-4 (702) order drawn during verification. Similarly, FIG. 7B depicts an exemplary stroke password comparison in which the strokes which are an exact inversion of each other are considered identical. That is: up=down, left=right, down-right=up-left and down-left=up-right. For example, under an exact match requirement, the letters (712) and (714) would not be considered matching because of the directional differences. However, using the depicted inversion alternative, the drawn letters would be considered as satisfying the comparison criteria because, although the strokes were in a different direction, they are mirror strokes. It will be appreciated that the embodiments described in FIGS. 7A and 7B may also be combined together when determining matches between saved stroke passwords and verification passwords and other types of flexible "matching" may also be implemented.

Figure 8:
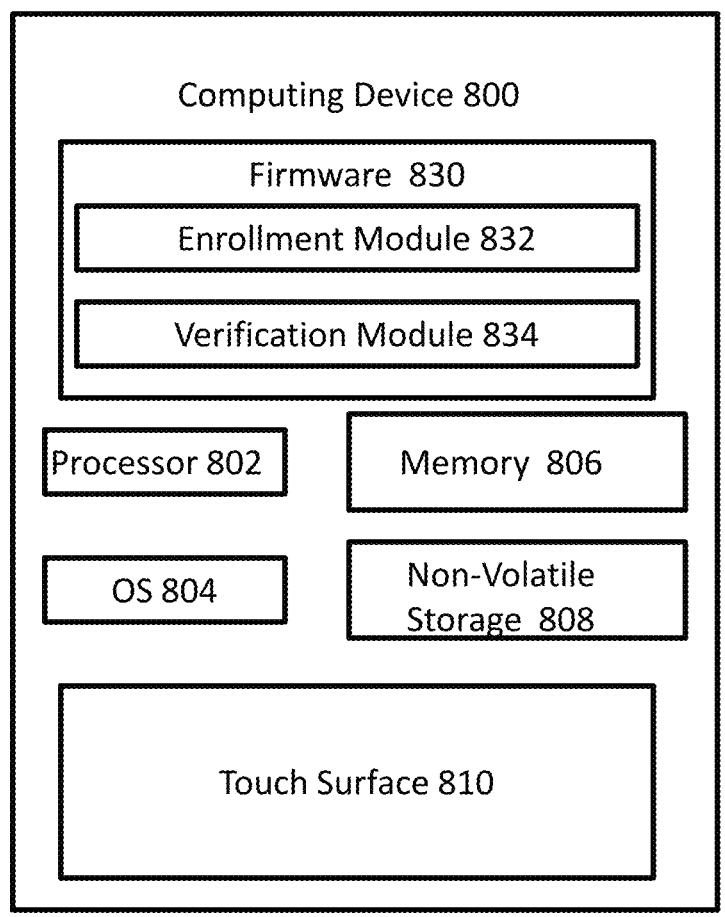
FIG. 8 depicts an exemplary environment suitable for practicing embodiments of the present invention.

FIG. 8 depicts an exemplary environment suitable for practicing the embodiments of the present invention. An exemplary computing device 800 is equipped with a touch surface 810 through which user input gestures and strokes such as finger movements may be accepted. The computing device 800 may be a tablet computing device, cell phone, smart phone, PDA, laptop, netbook, desktop computer, mobile computing device or other computing device equipped with, or in communication with, a touch surface and able to perform the functions described herein to enroll and verify gesture-based passwords. The computing device 800 includes a processor 802 for executing instructions and an operating system 804. The computing device further includes memory 806 such as random access memory (RAM) and includes or has access to non-volatile memory such as a hard drive. Computing device 800 further includes firmware 830 responsible for device initialization and for initially loading the OS 804 into memory. Firmware 830 includes an enrollment module 832 responsible for performing the processing described in FIG. 1 herein by which a stroke password is entered and saved by the embodiments of the present invention. Firmware 830 further includes a verification module 834 for performing the processing described in FIG. 2 by which a verification password is accepted and compared to saved stroke passwords in an attempt to perform user identification. It will be appreciated that enrollment module 832 and verification module 834 may be combined into one module or split into additional modules without departing from the scope of the present invention.

While the description contained herein has focused on touch-based devices in which firmware executes an identification process it should be appreciated that the embodiments of the present invention are not so limited. For example, embodiments of the present invention may also be implemented to accept mouse drawing/tracing movements instead of finger movements on a touch surface. Alternatively, instead of the invention being practiced by the computing device's firmware, the identification technique described herein could be conducted by an application or process under control of the operating system and verify user identity so as to control user access to various applications, data or the device in general (i.e. as a general log in requirement).

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory medium holding computer-executable instructions for providing gesture-based user identification, the instructions when executed causing at least one computing device to:

prompt a user to enter a word or image through a touch surface capable of accepting input gestures from the user, the word or image entered as a plurality of individual strokes;

create a stroke password from characteristics of the plurality of individual strokes, the characteristics including a stroke, direction and a stroke order;

store the characteristics of the plurality of individual strokes used to create the stroke password, the stored characteristics including stroke direction and stroke order, the stroke password associated with the user;

receive through the touch surface, subsequent to the storing of the characteristics of the plurality of individual strokes used to create the stroke password, a word or image entered as a plurality of additional individual strokes;

create a stroke verification password from characteristics of the plurality of additional individual strokes, the characteristics including a stroke direction and a stroke order for the plurality of additional individual strokes;

compare the stroke direction and stroke order of the plurality of additional individual strokes used to create the stroke verification password to the stored stroke direction and stroke order of the plurality of individual strokes used to create the stroke password; and identify a user that entered the stroke verification password on the basis of the comparison, wherein the instructions being executed are firmware.

2. The medium of claim 1 wherein the instructions when executed further cause the at least one computing device to:
prompt the user to re-enter the stroke password; and
compare the stroke password to the re-entered password to verify a match prior to storing the stroke password.

3. The medium of claim 2 wherein the user enters the stroke password initially by tracing a display of the word or image and re-enters the stroke password by drawing the word or image without the word or image being displayed.

4. The medium of claim 1 wherein a pre-drawn grid is superimposed over an enlarged character glyph when the user is entering at least one of the individual strokes that collectively form the stroke password.

5. The medium of claim 3 wherein, as a user traces the character glyph, stylized arrows are superimposed over the tracing.

6. The medium of claim 1 wherein a pre-drawn grid is superimposed over the touch surface without the touch surface displaying representations of the stroke password when the user is entering at least one of the individual strokes that collectively form the stroke password.

7. The medium of claim 1 wherein each individual stroke is initially recorded as a series of touch surface coordinates capturing a finger event or a gesture event, a finger event occurring when a user touches the touch surface or stops touching the touch surface and a gesture event occurring when a user moves his finger across the touch surface between finger events.

8. The medium of claim 7 wherein a trace for a gesture event is composed of a collection of x and y touch surface coordinates and the trace is processed into a series of one or more strokes.

9. The medium of claim 8 wherein the processing de-skews a trace drawn at an angle.

10. The medium of claim 8 wherein the processing:
calculates a bounding rectangle for the trace that is the smallest rectangle that can encompass all of the coordinates of the trace;
divides the total area of the bounding rectangle into a n×n grid;
records which grid squares are occupied by the trace; and
adjusts the record of occupied grid squares based on predetermined criteria to produce simplified box number pairs indicative of a stroke direction.

11. The medium of claim 1 wherein the stroke and verification passwords also include at least one of stroke connection information, stroke timing information and stroke intensity information.

12. A computing device providing gesture-based user identification, the computing device comprising:
a touch surface accepting input gestures from a user, and
a processor configured to execute instructions that:
prompt a user to enter a word or image through the touch surface, the word or image entered as a plurality of individual strokes;
create a stroke password from characteristics of the plurality of individual strokes, the characteristics including a stroke direction and a stroke order;
store the characteristics of the plurality of individual strokes used to create the stroke password, the stored characteristics including stroke direction and stroke order, the stroke password associated with the user;
receive through the touch surface, subsequent to the storing of the characteristics of the plurality of individual strokes used to create the stroke password, a word or image entered as a plurality of additional individual strokes;
create a stroke verification password from characteristics of the plurality of additional individual strokes, the characteristics including a stroke direction and a stroke order for the plurality of additional individual strokes;
compare stroke direction and stroke order of the plurality of additional individual strokes used to create the stroke verification password to the stored stroke direction and stroke order of the plurality of individual strokes used to create the stroke password; and
identify a user that entered the stroke verification password on the basis of the comparison,
wherein the instructions being executed are firmware.

13. The computing device of claim 12 wherein the stroke and verification passwords also include at least one of stroke connection information, stroke timing information and stroke intensity information.

14. A computer-implemented method for providing gesture-based user identification for a computing device, comprising:
generating a prompt using a firmware module for a user to enter a word or image through a touch surface capable of accepting input gestures from the user, the word or image entered as a plurality of individual strokes;
create a stroke password from characteristics of the plurality of individual strokes, the characteristics including a stroke direction and a stroke order;
storing the characteristics of the plurality of individual strokes used to create the stroke password, the stored characteristics including stroke direction and stroke order, the stroke password associated with the user;
receiving through the touch surface, subsequent to the storing of the characteristics of the plurality of individual strokes used to create the stroke password, a word or image entered as a plurality of additional individual strokes;
create a stroke verification password from characteristics of the plurality of additional individual strokes, the characteristics including a stroke direction and a stroke order for the plurality of additional individual strokes, the receiving performed using a firmware module;
comparing the stroke direction and stroke order of the plurality of additional individual strokes used to create the stroke verification password to the stored stroke direction and stroke order of the plurality of individual strokes used to create the stroke password, the comparing performed using a firmware module; and
identifying a user that entered the stroke verification password on the basis of the comparison, the identifying performed using a firmware module.

15. The method of claim 14, further comprising:
prompting the user to re-enter the stroke password; and
comparing the stroke password to the re-entered password to verify a match prior to storing the stroke password.

16. The method of claim 15 wherein the user enters the stroke password initially by tracing a display of the word or image and re-enters the stroke password by drawing the word or image without the word or image being displayed.

17. The method of claim 14 wherein a pre-drawn grid is superimposed over an enlarged character glyph when the user is entering at least one of the individual strokes that collectively form the stroke password.

18. The method of claim 17 wherein, as a user traces the character glyph, stylized arrows are superimposed over the tracing.

19. The method of claim 14 wherein a pre-drawn grid is superimposed over the touch surface without the touch surface displaying representations of the stroke password when the user is entering at least one of the individual strokes that collectively form the stroke password.

20. The method of claim 14 wherein each individual stroke is initially recorded as a series of touch surface coordinates capturing a finger event or a gesture event, a finger event occurring when a user touches the touch surface or stops touching the touch surface and a gesture event occurring when a user moves his finger across the touch surface between finger events.

21. The method of claim 20 wherein a trace for a gesture event is composed of a collection of x and y touch surface coordinates and the trace is processed into a series of one or more strokes.

22. The method of claim 21 wherein the processing de-skews a trace drawn at an angle.

23. The method of claim 21 wherein the processing:
calculates a bounding rectangle for the trace that is the smallest rectangle that can encompass all of the coordinates of the trace;
divides the total area of the bounding rectangle into a n×n grid;
records which grid squares are occupied by the trace; and
adjusts the record of occupied grid squares based on pre-determined criteria to produce simplified box number pairs indicative of a stroke direction.

24. The method of claim 14 wherein the stroke and verification passwords also include at least one of stroke connection information, stroke timing information and stroke intensity information.

\* \* \* \* \*